United States Patent
Kobayashi et al.

(10) Patent No.: US 9,429,207 B2
(45) Date of Patent: Aug. 30, 2016

(54) CYLINDER APPARATUS INCLUDING PLATED COMPONENT AND MANUFACTURING METHOD THEREOF

(71) Applicant: HITACHI AUTOMOTIVE SYSTEMS, LTD., Ibaraki (JP)

(72) Inventors: Yuichi Kobayashi, Sagamihara (JP); Takeshi Murakami, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 220 days.

(21) Appl. No.: 13/793,456

(22) Filed: Mar. 11, 2013

(65) Prior Publication Data

US 2013/0260167 A1    Oct. 3, 2013

(30) Foreign Application Priority Data

Mar. 30, 2012 (JP) ................. 2012/080497

(51) Int. Cl.
 *F16F 9/32* (2006.01)
 *B32B 15/04* (2006.01)
 *B32B 1/08* (2006.01)

(52) U.S. Cl.
 CPC ............. *F16F 9/3207* (2013.01); *B32B 1/08* (2013.01); *B32B 15/043* (2013.01); *F16F 9/3221* (2013.01); *F16F 9/3235* (2013.01); *F16F 2226/026* (2013.01); *Y10T 428/12292* (2015.01); *Y10T 428/12486* (2015.01)

(58) Field of Classification Search
 CPC .......................... F16F 9/3221; F16F 9/3235

USPC ............... 428/681; 148/525, 537; 29/888.04, 29/888.06
See application file for complete search history.

(56) References Cited

U.S. PATENT DOCUMENTS

| | | | |
|---|---|---|---|
| 6,329,071 | B1 | 12/2001 | Kobayashi et al. |
| 2004/0035002 | A1* | 2/2004 | Nishimura ............... B21K 1/10 29/895 |
| 2007/0034301 | A1* | 2/2007 | Hasegawa et al. ........... 148/318 |
| 2009/0255504 | A1* | 10/2009 | Ogino et al. ............... 123/193.5 |

FOREIGN PATENT DOCUMENTS

JP    2000-199095    7/2000

* cited by examiner

Primary Examiner — David Sample
Assistant Examiner — Lucas Wang
(74) Attorney, Agent, or Firm — Wenderoth, Lind & Ponack, L.L.P.

(57) ABSTRACT

A steel base material (11) is subjected to a quenching step, a machining step, a plating step, and a tempering step to form a rod (4). In the quenching step, two axially spaced portions of the steel base material are quenched to form quenched portions (12 and 13). In the machining step, plastic working or cutting is performed on a portion of the steel base material between the two quenched portions to form a full-circumferential groove (4C1) in a machined portion 4C. In the plating step, the quenched portion (12) is not plated, but a region of the steel base material including the quenched portion (13) is plated to form a coating layer (16). In the tempering step, the quenched portions are tempered.

15 Claims, 3 Drawing Sheets

CYLINDER APPARATUS INCLUDING PLATED COMPONENT AND MANUFACTURING METHOD THEREOF

BACKGROUND OF THE INVENTION

1. Technical Field

The present invention relates to a method of manufacturing a plated component by plating a steel bar or a steel pipe as a steel base material, for example, a rod of a cylinder apparatus, e.g. a hydraulic cylinder, or a hydraulic shock absorber. The present invention also relates to a plated component manufactured by the plated component manufacturing method.

2. Description of the Related Art

A hydraulic shock absorber provided as a cylinder apparatus in a running apparatus, e.g. an automobile, substantially comprises a cylinder incorporating a piston, and a rod connected at one end thereof to the piston in the cylinder and retractably projecting at the other end thereof from the cylinder through a rod guide.

The rod has an annular stopper (rebound stopper) attached to the outer periphery of an axially intermediate part thereof. The stopper abuts against the rod guide when the rod is extended, thereby defining the most extended position of the rod.

The stopper is secured to the rod by what is called metal flow joining. That is, a full-circumferential groove is formed on the outer peripheral surface of the rod, and a part of the stopper is pushed into the full-circumferential groove through plastic deformation.

The rod slidingly contacts the rod guide, for example, as it extends and contracts. Therefore, the surface of the rod is plated with chromium or the like for the purpose of improving wear resistance, slidability, and so forth (for example, see Japanese Patent Application Publication No. 2000-199095).

SUMMARY OF THE INVENTION

The rod is required to exhibit satisfactory slidability and therefore needs to be plated. On the other hand, the plated rod has the problem that it is difficult to perform plastic working or cutting to form a groove for metal flow joining because the plated rod surface is hard.

The present invention has been made in view of the above-described problem in the known methods and apparatuses. Accordingly, an object of the present invention is to provide a plated component manufacturing method capable of improving productivity while improving slidability required for a rod as a steel bar or a steel pipe. Another object of the present invention is to provide a plated component manufactured by the plated component manufacturing method of the present invention.

To solve the above-described problem, the present invention provides a plated component manufacturing method in which a steel bar or a steel pipe is plated. The method comprises a quenching step of quenching at least two axially spaced portions of the steel bar or the steel pipe to form at least two quenched portions, a machining step of performing plastic working or cutting on a portion of the steel bar or the steel pipe between the at least two quenched portions to form a machined portion, and a plating step in which one part of the at least two quenched portions that faces the other part of the at least two quenched portions across the machined portion is not plated, but a region of the steel bar or the steel pipe that includes at least a part of the other part of the at least two quenched portions is plated.

In addition, the present invention provides a plated component obtained by plating a steel bar or a steel pipe. The plated component has a plated portion having been subjected to high-frequency induction quenching, plating, and tempering, a non-plated portion provided at a position axially different from the plated portion, the non-plated portion having been subjected to high-frequency induction quenching and tempering and not subjected to plating, and a machined portion provided between the plated portion and the non-plated portion, the machined portion having been subjected to plastic working or cutting and not subjected to either of high-frequency induction quenching and plating.

According to the present invention, it is possible to improve productivity while improving slidability required for a rod as a steel bar or a steel pipe.

DETAILED DESCRIPTION OF THE INVENTION

The present invention will be explained below in detail with reference to FIGS. 1 and 2 with regard to a rod of a cylinder apparatus as an example of a plated component according to an embodiment of the present invention.

Figure 1:
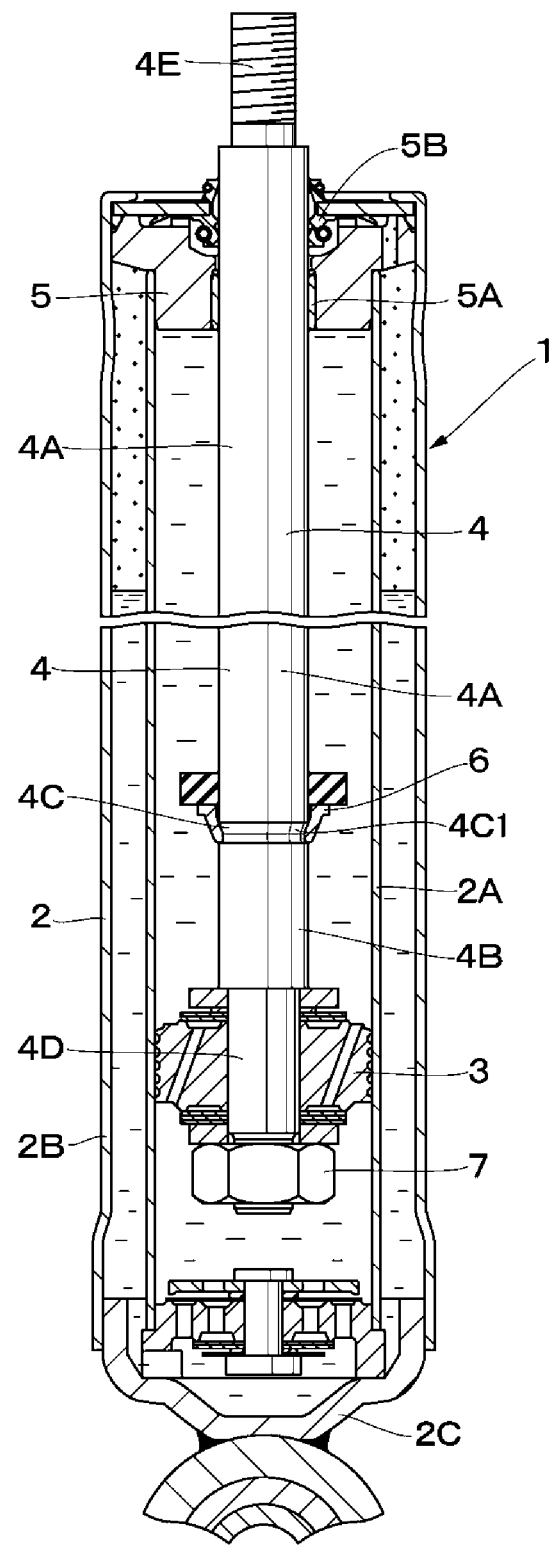
FIG. 1 is a vertical sectional view of a hydraulic shock absorber having a rod according to an embodiment of the present invention.

FIG. 1 shows a hydraulic shock absorber 1 having a rod 4 plated by a plated component manufacturing method according to this embodiment.

The hydraulic shock absorber 1 as a cylinder apparatus substantially comprises a cylinder 2, a piston 3, a rod (piston rod) 4, and a rod guide 5. The cylinder 2 has a hydraulic fluid sealed therein and is open at one end thereof (upper end in FIG. 1). More specifically, the cylinder 2 has a double-tube structure comprising an inner tube 2A and an outer tube 2B. The lower end of the cylinder 2 is closed with a bottom cap 2C.

The piston 3 is axially slidably fitted in the inner tube 2A of the cylinder 2 to divide the interior of the inner tube 2A into two chambers. The rod (piston rod) 4 as a plated component is connected at one axial end thereof (lower end in FIG. 1) to the piston 3. The other axial end of the rod 4 is extended to the outside of the cylinder 2 through the opening of the cylinder 2. The rod guide 5 serving as a seal member is provided in the opening of the cylinder 2 to slidingly contact (slide relative to) the rod 4 through a sleeve 5A and a seal ring 5B.

The rod 4 is formed by a manufacturing method (described later) as an elongated circular columnar member (circular columnar bar, or circular cylindrical pipe) extending in an axial direction (vertical direction in FIG. 1; horizontal direction in FIG. 2). More specifically, the rod 4 is formed as a plated component obtained by subjecting a steel base material 11 (see FIG. 2), which is a steel bar or a steel pipe, to heat treatment, plating, and necessary machining (plastic working, cutting, grinding, polishing, etc.). The rod 4 has a plated portion 4A, a non-plated portion 4B, a machined portion 4C, one mounting end portion 4D, and another mounting end portion 4E.

The plated portion 4A is a region having been subjected to quenching (high-frequency induction quenching), plating (hard chromium plating), and tempering. The plated portion 4A having a plated surface can ensure wear resistance and slidability for a long period of time despite the sliding contact with the sleeve 5A and seal ring 5B of the rod guide 5. The plated portion 4A is preferably subjected to grinding or polishing after the high-frequency induction quenching treatment and before the plating treatment, if necessary. The reason for this is as follows. Grinding or polishing makes it possible to smooth the surface roughness of the region of the rod 4 that is to become the plated portion 4A prior to the plating treatment, and hence possible to improve the finish of a coating layer 16 (see FIG. 16) of the plated portion 4A and to improve the adhesive property (coating strength) of the coating layer 16.

It is also preferable to grind or polish the plated portion 4A after the tempering treatment, if necessary. The reason for this is as follows. If buffing is performed as a polishing treatment, the coating layer 16 of the plated portion 4A can be plastically deformed to close cracks in the coating layer 16. This makes it possible to suppress corrosion (rust) of the steel base material 11 constituting the base metal underlying the coating layer 16.

On the other hand, the non-plated portion 4B is provided on the rod 4 at a position axially different from the plated portion 4A. The non-plated portion 4B is a region having been subjected to quenching (high-frequency induction quenching) and tempering and not subjected to plating (hard chromium plating). The non-plated portion 4B is subjected to heat treatments similar to those for the plated portion 4A, except plating. Therefore, the non-plated portion 4B has properties similar to those of the base metal of the plated portion 4A. If the whole rod 4 is subjected to quenching (high-frequency induction quenching), plating (hard chromium plating), and tempering, the surface hardness of the rod 4 after the tempering cannot be directly measured because of the presence of the coating layer 16 on the surface, and the coating layer 16 has to be partly removed in order to measure the surface hardness. In this regard, the rod 4 of this embodiment is provided with the non-plated portion 4B. Therefore, the surface hardness of the base metal of the plated portion 4A can be obtained by measuring the surface hardness of the non-plated portion 4B without partly removing the coating layer 16 of the plated portion 4A.

The machined portion 4C is provided between the plated and non-plated portions 4A and 4B of the rod 4. The machined portion 4C is a region having been subjected to plastic working or cutting and not subjected to either of quenching (high-frequency induction quenching) and plating (hard chromium plating). The machined portion 4C has a full-circumferential groove 4C1 formed by plastic working or cutting. The full-circumferential groove 4C1 is fitted with a stopper (rebound stopper) 6 that abuts against the rod guide 5 when the rod 4 extends to a considerable extent to restrict further extension of the rod 4. The stopper 6 is secured to the full-circumferential groove 4C1 by a joining method, e.g. metal flow joining.

The surface hardness of the machined portion 4C is made lower than those of the plated and non-plated portions 4A and 4B. Consequently, it is possible to easily and stably perform machining of the machined portion 4C, i.e. plastic working or cutting for forming the full-circumferential groove 4C1.

The one mounting end portion 4D is provided at one end (lower end in FIG. 1; right end in FIG. 2) of the rod 4. The one mounting end portion 4D has an outer diameter smaller than those of the plated and non-plated portions 4A and 4B. The one mounting end portion 4D has the piston 3 secured thereto. The piston 3 is prevented from falling off the rod 4 by a nut 7 thread-engaged with the distal end of the one mounting end portion 4D.

The other mounting end portion 4E is provided at the other end (upper end in FIG. 1; left end in FIG. 2) of the rod 4. The other mounting end portion 4E has an outer diameter smaller than those of the plated and non-plated portions 4A and 4B. The other mounting end portion 4E is secured to a vehicle body-side member (not shown) of a vehicle, for example.

Next, the method of manufacturing the rod 4 of the hydraulic shock absorber 1 will be explained with reference to FIG. 2.

Figure 2:
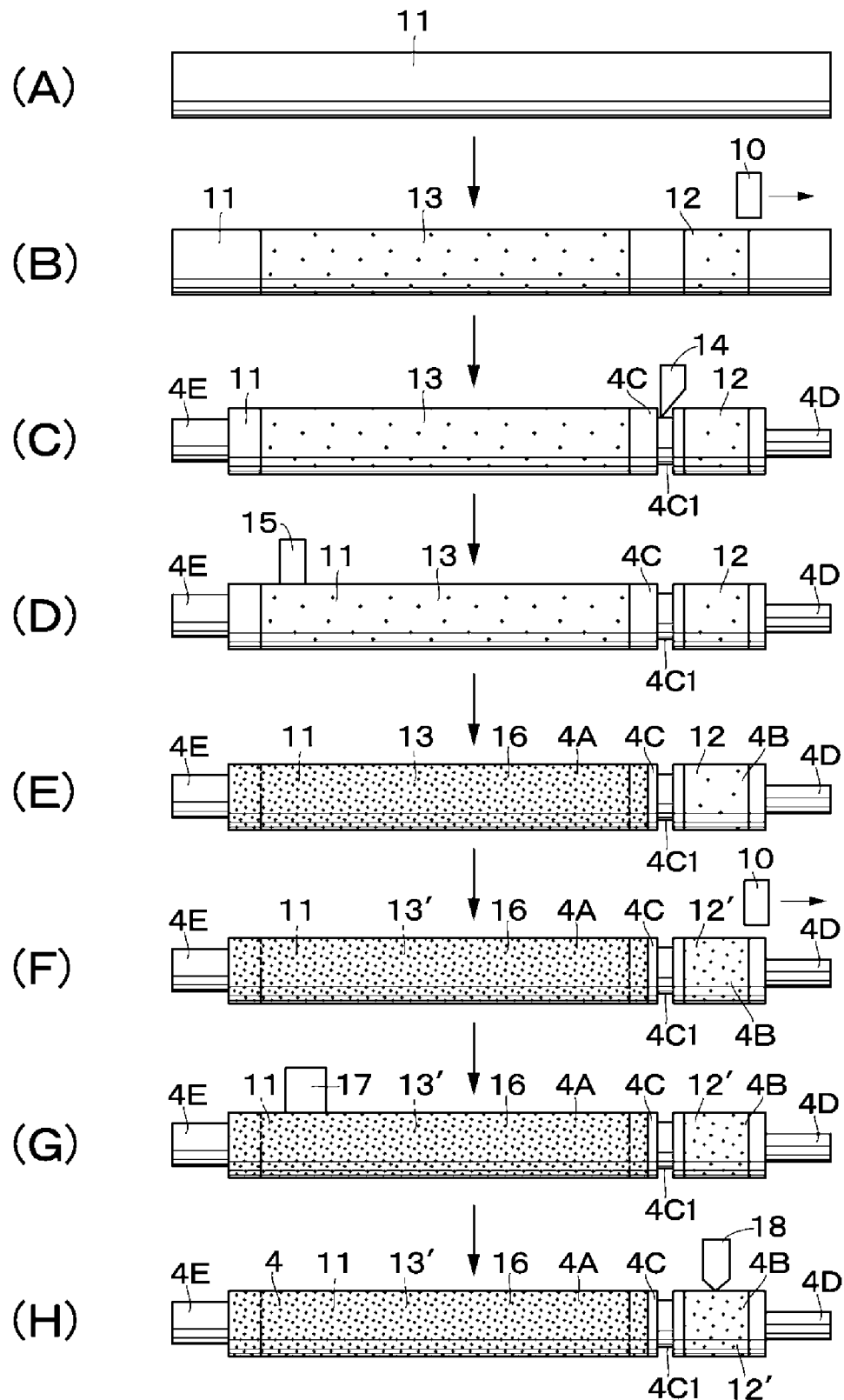
FIG. 2 is a chart showing the steps of manufacturing the rod according to the embodiment in order from the step (A) to the step (H).

The rod 4 shown in FIG. 1 is formed by performing heat treatment, plating, and necessary machining on a steel base material 11 as shown in part (A) of FIG. 2, which is a steel bar or a steel pipe cut into a predetermined length. More specifically, the steel base material 11 shown in part (A) of FIG. 2 is formed into the rod 4, shown in FIG. 1, by being successively subjected to a "quenching step" shown in part (B) of FIG. 2, a "machining step" shown in part (C) of FIG. 2, a "pre-plating grinding step" shown in part (D) of FIG. 2, a "plating step" shown in part (E) of FIG. 2, a "tempering step" shown in part (F) of FIG. 2, a "post-plating grinding step" shown in part (G) of FIG. 2, and, if necessary, a "measuring step" shown in part (H) of FIG. 2.

In the "quenching step" shown in part (B) of FIG. 2, an induction heating coil 10 is moved relative to the steel base material 11 shown in part (A) of FIG. 2 in the axial direction of the latter to quench two axially spaced portions of the steel base material 11 by high-frequency induction quenching, thereby forming quenched portions 12 and 13. Of the two quenched portions 12 and 13, the quenched portion 12 is closer to one end (right end in FIG. 2) and formed in a region that becomes a non-plated portion 4B when the rod 4 is finished. The other quenched portion 13 is axially spaced from the quenched portion 12. The quenched portion 13 is formed in a region that becomes a plated portion 4A when the rod 4 is finished. The surface hardness of the quenched portions 12 and 13 formed by high-frequency induction quenching is from 650 HV to 800 HV when S45 (carbon steel for machine structural use) is used as the steel base material 11, for example.

After the two quenched portions 12 and 13 have been formed by quenching as shown in part (B) of FIG. 2, the "machining step" shown in part (C) of FIG. 2 is performed. In the "machining step", a region of the steel base material 11 located between the two quenched portions 12 and 13 is subjected to plastic working or cutting to form a full-circumferential groove 4C1. The "machining step" may be carried out, for example, by cutting in which the full-circumferential groove 4C1 is formed with a cutting tool by using a lathe or the like, or plastic working in which the full-circumferential groove 4C1 is formed by pressing a rolling roller (not shown) against the steel base material 11. In this case, the region between the two quenched portions 12 and 13, i.e. the region that becomes a machined portion 4C when the rod 4 is finished, has not been quenched.

Therefore, it is possible to easily and stably perform plastic working or cutting for forming the full-circumferential groove 4C1.

It should be noted that, in the step shown in part (C) of FIG. 2, the opposite ends of the steel base material 11 are also subjected to cutting, for example, to reduce the diameter of the end regions, thereby forming one mounting end portion 4D and another mounting end portion 4E. In this case, the ends of the steel base material 11 have not been quenched as in the case of the region where the full-circumferential groove 4C1 is formed. Therefore, it is also possible to easily and stably perform machining for forming the one mounting end portion 4D and the other mounting end portion 4E.

After the full-circumferential groove 4C1 has been formed as shown in part (C) of FIG. 2, the "pre-plating grinding step" shown in part (D) of FIG. 2 is performed. The "pre-plating grinding step" is performed after the "quenching step" and before the "plating step" (described later). More specifically, prior to the below-described "plating step", grinding or polishing is performed on at least a part of a region to be plated in the "plating step", e.g. a region of the steel base material 11 between the full-circumferential groove 4C1 and the other mounting end portion 4E. The "pre-plating grinding step" may be performed, for example, by grinding in which the surface of the steel base material 11 is ground with a grindstone 15 by using a grinding machine, or polishing in which the surface of the steel base material 11 is polished by using abrasive cloth, paper or grain, or other abrasive material. Consequently, the surface roughness of the region to be plated can be smoothed before the "plating step". Accordingly, it is possible to improve the finish of the coating layer 16 and to improve the adhesive property (coating strength) of the coating layer 16.

After the region to be plated has been ground or polished prior to the "plating step" as shown in part (D) of FIG. 2, the "plating step" shown in part (E) of FIG. 2 is performed. In the "plating step", the quenched portion 12, which is one part of the two quenched portions 12 and 13 that faces the other part of the two quenched portions 12 and 13 across the full-circumferential groove 4C1, is not plated, but a region of the steel base material 11 including the quenched portion 13, which constitutes the whole of the other part of the two quenched portions 12 and 13, is plated. Plating performed in the "plating step" may, for example, be chromium plating (hard chromium plating).

In the example shown in FIG. 2, the region of the steel base material 11 extending from the left end of the full-circumferential groove 4C1 to the right end of the other mounting end portion 4E, exclusive, as seen in FIG. 2 is plated, thereby forming a coating layer 16 on this region (i.e. the surface of the region is covered with the coating layer 16). Consequently, it is possible to ensure the wear resistance and slidability of the region of the rod 4 that slidingly contacts the sleeve 5A and seal ring 5B of the rod guide 5. On the other hand, the quenched portion 12, which is not plated, i.e. not covered with the coating layer 16, can maintain properties similar to those of the base metal of the plated region even after the "tempering step" (described later). It should be noted that the coating layer 16 may be formed as far as a position where the coating layer 16 covers the full-circumferential groove 4C1, for example, although not shown in the figure.

After the coating layer 16 has been formed so as to cover the quenched portion 13 as shown in part (E) of FIG. 2, the "tempering step" shown in part (F) of FIG. 2 is performed. In the "tempering step", the quenched portions 12 and 13 are tempered. In FIG. 2, the tempered quenched portions 12 and 13 are denoted by reference numerals 12' and 13', respectively.

The "tempering step" also serves as baking (hydrogen embrittlement removal heating) for releasing hydrogen occluded in the steel base material 11 by the plating. Therefore, the tempering is carried out, for example, by heating the steel base material 11 for not less than 1 hour at a temperature of from 190° to 300°, which is also suitable for baking. More specifically, when the steel base material 11 is heated for 1 hour at a temperature of 230°, for example, the surface hardness of the steel base material 11 becomes about 580 HV. When the heating is carried out for 4 hours at a temperature of 250°, for example, the surface hardness of the steel base material 11 becomes about 550 HV.

After the tempering also serving as baking has been performed as shown in part (F) of FIG. 2, the "post-plating grinding step" shown in part (G) of FIG. 2 is performed. In the "post-plating grinding step", the plated region, i.e. the coating layer 16 covering the steel base material 11, is ground or polished after the tempering step. The "post-plating grinding step" may be carried out, for example, by buffing in which the surface (coating layer 16) is polished by using a buff (abrasive cloth) coated with an abrasive material. Consequently, the coating layer 16 can be plastically deformed to close cracks in the coating layer 16. This makes it possible to suppress corrosion (rust) of the steel base material 11.

After the coating layer 16 has been polished by buffing as shown in part (G) of FIG. 2, the "measuring step" is performed as shown part (H) of FIG. 2. In the "measuring step", the one part (quenched portion 12'), which has been tempered after being quenched, i.e. the non-plated portion 4B, which has been quenched and tempered and not plated, is subjected to the measurement of hardness with a hardness measuring device 18. In this case, the non-plated portion 4B has properties similar to those of the base metal of the plated portion 4A, which is covered with the coating layer 16. Therefore, the surface hardness of the base metal of the plated portion 4A can be obtained by measuring the surface hardness of the non-plated portion 4B without partly removing the coating layer 16 of the plated portion 4A. It should be noted that the "measuring step" need not be carried out for all rods 4 but may be performed only for rods 4 that need measurement for quality control or the like, for example.

Thus, according to this embodiment, two axially spaced portions of the steel base material 11 are quenched by high-frequency induction quenching, and a non-quenched portion between the two quenched portions is subjected to plastic working or cutting. Accordingly, the plastic working or the cutting can be performed easily and stably, and hence productivity can be improved. In addition, the coating layer 16 enables an improvement in slidability against the sleeve 5A and the seal ring 5B.

In addition, the surface hardness of the steel base material 11 constituting the base metal underlying the coating layer 16 can be measured without partly removing the coating layer 16. That is, in the "plating step" shown in part (E) of FIG. 2, the quenched portion 12, which is one part of the two axially spaced quenched portions 12 and 13 of the steel base material 11 that faces the other part of the quenched portions 12 and 13 across the machined portion 4C (full-circumferential groove 4C1), is not plated, but a region of the steel base material 11 including the quenched portion 13, which constitutes the whole of the other part of the quenched portions 12 and 13, is plated. Consequently, the non-plated portion 4B, which is the one part not plated in the "plating step", can maintain properties similar to those of the base metal of the plated portion 4A, which is the part plated in the "plating step", even if the "tempering step" is performed after the "plating step". Thus, the surface hardness of the base metal underlying the coating layer 16 can be obtained by measuring the surface hardness of the non-plated portion 4B without partly removing the coating layer 16.

In this case, the quenched portion 12, which is to become the non-plated portion 4B, is quenched prior to the "machining step" and tempered after the "machining step", in the same way as the quenched portion 13, which is to become the plated portion 4A. Therefore, the hardness of the quenched portion 12, which is to become the non-plated portion 4B, can be ensured during the "machining step". Accordingly, it is possible to improve the flaw resistance (resistance to damage) of the non-plated portion 4B.

According to this embodiment, the "measuring step" for measuring the hardness of the non-plated portion 4B is performed after the "tempering step". Therefore, it is possible to facilitate and simplify the measuring operation, to suppress variation of measured values, to improve the accuracy and reliability of the measurement and to reduce costs, in comparison to a measuring process in which the coating layer 16 is partly removed to measure the hardness. In addition, if the coating layer 16 is partly removed to measure the hardness, the rod that has undergone the measurement may become a defective product that cannot be shipped. In contrast, the rod 4 subjected to the measurement of hardness by measuring the hardness of the non-plated portion 4B can be shipped as a non-defective product.

According to this embodiment, the "pre-plating grinding step" is performed after the "quenching step" and before the "plating step". Therefore, the surface roughness of the steel base material 11 can be smoothed before the "plating step". Thus, it is possible to improve the finish of the coating layer 16 and to improve the adhesive property (coating strength) of the coating layer 16.

According to this embodiment, the "tempering step" also serves as baking (hydrogen embrittlement removal treatment). Therefore, the number of times at which the steel base material 11 is heated can be reduced in comparison to a manufacturing process in which tempering and baking are performed separately from each other. Accordingly, it is possible to save energy and to reduce costs. In this case, the baking makes it possible to reduce hydrogen embrittlement and to suppress corrosion (white rust) of the metallic coating itself in an acid environment.

If the manufacturing steps are performed in the following order: "quenching"→"tempering"→"plating"→"baking", for example, the tempered steel base material is plated. Consequently, the width of cracks in the coating layer may increase as a result of the shrinkage of the coating layer due to heating during the "baking". In contrast, when the manufacturing steps are performed in the following order: "quenching"→"plating"→"tempering also serving as baking", both the steel base material 11 and the coating layer 16 shrink during the "tempering also serving as baking". Accordingly, it is possible to suppress the increase in the width of cracks in the coating layer 16.

According to this embodiment, the "post-plating grinding step" is performed after the "tempering step". Therefore, by performing buffing, for example, the coating layer 16 can be plastically deformed to close cracks in the coating layer 16. In this case, it is possible to close cracks (channel cracks) so deep that they reach the steel base material 11, for example, and hence possible to suppress corrosion (rust) of the steel base material 11.

According to this embodiment, the rod 4 has the plated portion 4A, the non-plated portion 4B, and the machined portion 4C. Therefore, the surface hardness of the steel base material 11 constituting the base metal underlying the coating layer 16 can be obtained by measuring the surface hardness of the non-plated portion 4B without partly removing the coating layer 16 of the plated portion 4A. In this case, the non-plated portion 4B can ensure hardness and strength required therefor because this region has been subjected to the high-frequency induction quenching treatment and the tempering treatment. On the other hand, the machined portion 4C has not been subjected to the high-frequency induction quenching treatment. Therefore, it is possible to suppress an excessive increase in the hardness and strength of the region to be machined, and hence possible to perform plastic working or cutting easily and stably. In addition, because the plated portion 4A is covered with the coating layer 16, it is possible to ensure wear resistance and slidability against the sleeve 5A and seal ring 5B of the rod guide 5.

According to this embodiment, the surface hardness of the machined portion 4C is made lower than those of the plated and non-plated portions 4A and 4B. Therefore, it is possible to easily and stably perform plastic working or cutting for the machined portion 4C.

It should be noted that, in the above-described embodiment, the present invention has been explained by way of an example in which two portions of the steel base material 11 are quenched (i.e. two quenched portions 12 and 13 are formed). The present invention, however, is not limited to the above-described structure. For example, three portions of the steel base material 11 may be quenched (i.e. three quenched portions 21, 22 and 23 are formed) as in a first modification shown in FIG. 3 and as in a second modification shown in FIG. 4. Alternatively, four or more quenched portions may be formed. In other words, the steel base material (steel bar or steel pipe) may be quenched at at least two axially spaced portions thereof.

Figure 3:
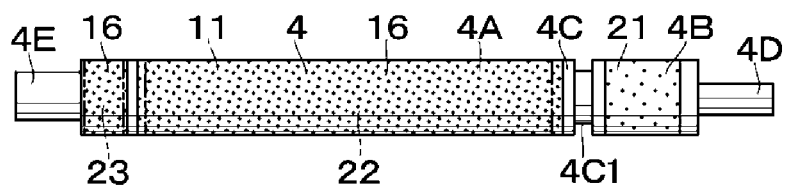
FIG. 3 is a front view of a rod according a first modification as seen in the same direction as in FIG. 2.
Figure 4:
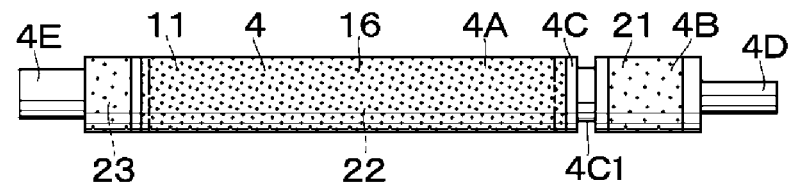
FIG. 4 is a front view of a rod according to a second modification as seen in the same direction as in FIG. 2.

In the above-described embodiment, the present invention has been explained by way of an example in which the quenched portion 12, which is one part of the two quenched portions 12 and 13 that faces the other part of the two quenched portions 12 and 13 across the machined portion 4C (full-circumferential groove 4C1), is not plated, but a region of the steel base material 11 including the quenched portion 13, which constitutes the whole of the other part of the two quenched portions 12 and 13, is plated. The present invention, however, is not limited to the above-described structure. For example, the structure may be as follows. As shown in FIG. 3, which illustrates the first modification, the quenched portion 21, which is one part of the three quenched portions 21, 22 and 23 that faces the other part of the three quenched portions 21, 22 and 23 across the machined portion 4C (full-circumferential groove 4C1), is not plated, but a region of the steel base material 11 including the quenched portions 22 and 23, which constitute the whole of the other part of the three quenched portions 21, 22 and 23, is plated. The structure may also be as follows. As shown in FIG. 4, which illustrates the second modification, the quenched portion 21, which is one part of the three quenched portions 21, 22 and 23 that faces the other part of the three quenched portions 21, 22 and 23 across the machined portion 4C (full-circumferential groove 4C1), is not plated, but a region of the steel base material 11 including the quenched portion 22, which constitutes a part of the other part of the three quenched portions 21, 22 and 23, is plated.

In the above-described embodiment, the present invention has been explained by way of an example in which the steps of the method of manufacturing the rod 4 are performed in the following order: the "quenching step"→"machining step"→"pre-plating grinding step"→"plating step"→"tempering step"→"post-plating grinding step"→"measuring step". The present invention, however, is not limited to the above. The "pre-plating grinding step" and the "post-plating grinding step" may be omitted, if necessary.

In the above-described embodiment, the present invention has been explained by way of an example in which the present invention is applied as a plated component to the rod 4 used in the hydraulic shock absorber 1. The present invention, however, is not limited to the rod 4 used in the hydraulic shock absorber 1. For example, the present invention may be applied to a rod used in other cylinder apparatus, e.g. a hydraulic cylinder. Further, the present invention is not limited to rods of cylinder apparatus but may be applied to a plated component incorporated in other mechanical apparatus. More specifically, the present invention may also be applied to a plated component having a sliding portion.

According to the above-described embodiment, it is possible to improve productivity while improving slidability required for the rod as a steel base material (steel bar or steel pipe). In addition, it is possible to measure the surface hardness of the steel base material constituting the base metal underlying the coating layer without partly removing the coating layer.

That is, the plating step is performed such that one part of at least two axially spaced quenched portions formed on the steel base material (steel bar or steel pipe), which faces the other part of the at least two quenched portions across the machined portion, is not plated, but a region of the steel base material that includes at least a part of the other part of the at least two quenched portions is plated. Consequently, the non-plated one part can maintain properties similar to those of the base metal of the plated component even if tempering is performed after the plating step. Thus, the surface hardness of the base metal underlying the coating layer can be obtained by measuring the surface hardness of the non-plated one part without partly removing the coating layer.

In this case, the one part, which is not plated, is quenched prior to the machining step and tempered after the machining step in the same way as the other quenched part. Therefore, the hardness of the non-plated one part can be ensured during the machining step. Accordingly, it is possible to improve the flaw resistance (resistance to damage) of the non-plated one part.

According to the embodiment, the measuring step for measuring the hardness of the non-plated one part is performed after the tempering step. Therefore, it is possible to facilitate and simplify the measuring operation, to suppress variation of measured values, to improve the accuracy and reliability of the measurement and to reduce costs, in comparison to a measuring process in which the coating layer is partly removed to measure the hardness. In addition, if the coating layer is partly removed to measure the hardness, the plated component that has undergone the measurement may become a defective product that cannot be shipped. In contrast, the plated component subjected to the measurement of hardness by measuring the hardness of the non-plated one part can be shipped as a non-defective product.

According to the embodiment, the pre-plating grinding step is performed after the quenching step and before the plating step. Consequently, the surface roughness of the steel base material (steel bar or steel pipe) can be smoothed before the plating step. Accordingly, it is possible to improve the finish of the coating layer and to improve the adhesive property (coating strength) of the coating layer.

According to the embodiment, the tempering step also serves as baking (hydrogen embrittlement removal treatment). Therefore, the number of times at which the steel base material (steel bar or steel pipe) is heated can be reduced in comparison to a manufacturing process in which tempering and baking are performed separately from each other. Accordingly, it is possible to save energy and to reduce costs. In this case, the baking makes it possible to reduce hydrogen embrittlement and to suppress corrosion (white rust) of the metallic coating itself in an acid environment.

If the manufacturing steps are performed in the following order: "quenching"→"tempering"→"plating"→"baking", for example, the tempered steel base material (steel bar or steel pipe) is plated. Consequently, the width of cracks in the coating layer may increase as a result of the shrinkage of the coating layer due to heating during "baking" In contrast, when the manufacturing steps are performed in the following order: "quenching"→"plating"→"tempering also serving as baking", both the steel base material (steel bar or steel pipe) and the coating layer shrink during the "tempering also serving as baking". Accordingly, it is possible to suppress the increase in the width of cracks in the coating layer.

According to the embodiment, the post-plating grinding step is performed after the tempering step. Therefore, by performing buffing, for example, the coating layer can be plastically deformed to close cracks in the coating layer. In this case, it is possible to close cracks (channel cracks) so deep that they reach the steel base material (steel bar or steel pipe), for example, and hence possible to suppress corrosion (rust) of the steel base material (steel bar or steel pipe).

According to the embodiment, the plated component has the plated portion, the non-plated portion, and the machined portion. Therefore, the surface hardness of the steel base material constituting the base metal underlying the coating layer can be obtained by measuring the surface hardness of the non-plated portion without partly removing the coating layer of the plated portion. In this case, the non-plated portion can ensure hardness and strength required therefor because this region has been subjected to the high-frequency induction quenching treatment and the tempering treatment. On the other hand, the machined portion has not been subjected to the high-frequency induction quenching. Therefore, it is possible to suppress an excessive increase in the hardness and strength of the region to be machined, and hence possible to perform plastic working or cutting stably. In addition, because the plated portion is covered with the coating layer, it is possible to ensure wear resistance and slidability.

According to the embodiment, the surface hardness of the machined portion is made lower than those of the plated portion and the non-plated portion. Therefore, it is possible to stably perform plastic working or cutting for the machined portion.

According to the embodiment, grinding or polishing is performed after the high-frequency induction quenching treatment and before the plating treatment. Therefore, it is possible to smooth the surface roughness of the region that is to become the plated portion prior to the plating treatment, and hence possible to improve the finish of the coating layer of the plated portion and to improve the adhesive property (coating strength) of the coating layer.

According to the embodiment, the tempering step also serves as baking (hydrogen embrittlement removal treatment). Therefore, the number of times at which the steel base material (steel bar or steel pipe) is heated can be reduced in comparison to a manufacturing process in which tempering and baking are performed separately from each other. Accordingly, it is possible to save energy and to reduce costs. In this case, the baking makes it possible to reduce hydrogen embrittlement and to suppress corrosion (white rust) of the metallic coating itself in an acid environment.

According to the embodiment, grinding or polishing is performed after the tempering treatment. Therefore, by performing buffing as a polishing treatment, for example, the coating layer of the plated portion can be plastically deformed to close cracks in the coating layer. In this case, it is possible to close cracks (channel cracks) so deep that they reach the steel base material (steel bar or steel pipe), for example, and hence possible to suppress corrosion (rust) of the steel base material (steel bar or steel pipe).

According to the embodiment, the plated component is used as a rod of a cylinder apparatus. Therefore, the surface hardness of the steel base material constituting the base metal underlying the coating layer can be obtained by measuring the surface hardness of the non-plated portion of the rod without partly removing the coating layer of the plated portion of the rod. Accordingly, it is possible to facilitate and simplify the measuring operation, to suppress variation of measured values, to improve the accuracy and reliability of the measurement and to reduce costs. In addition, because the coating layer is not partly removed to measure the hardness, the plated component that has undergone the measurement can be shipped as a non-defective product.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-080497, filed on Mar. 30, 2012. The entire disclosure of Japanese Patent Applications No. 2012-080497, filed on Mar. 30, 2012 including specification, claims, drawings and summary is incorporated herein by reference in its entirety.

What is claimed is:

1. A cylinder apparatus comprising a cylinder having a hydraulic fluid sealed therein, a piston axially slidably fitted in the cylinder, and a rod, a first axial end of the rod being connected to the piston and a second axial end of the rod extending to an outside of the cylinder, the rod being a plated component obtained by plating one of a steel bar and a steel pipe, and the plated component comprising:
    a plated portion having been subjected to quenching and plating;
    a non-plated portion provided at a position axially different from the plated portion, the non-plated portion having been subjected to quenching and not subjected to plating; and
    a machined portion provided between the plated portion and the non-plated portion, the machined portion having been subjected to one of plastic working and cutting and not subjected to either of quenching and plating.

2. The cylinder apparatus of claim 1, wherein the machined portion has a surface hardness lower than a surface hardness of the plated portion and a surface hardness of the non-plated portion.

3. The cylinder apparatus of claim 1, wherein the quenching is high-frequency induction quenching.

4. The cylinder apparatus of claim 1, wherein quenched portions of the plating portion and the non-plating portion have been subjected to tempering.

5. The cylinder apparatus of claim 1, wherein the plated portion has been subjected to one of grinding and polishing.

6. The cylinder apparatus of claim 1, wherein the machined portion is formed by performing machining after the quenching of the plated portion and the non-plated portion.

7. The cylinder apparatus of claim 1, wherein the cylinder has an opening at one end thereof and a rod guide in the opening,
    wherein one end of the plated component extends to an outside of the cylinder through the rod guide, the plated portion is configured to slide relative to the rod guide, and the non-plated portion and the machined portion are configured not to slide relative to the rod guide.

8. A method of manufacturing the cylinder apparatus of claim 6, the method comprising:
    a quenching step of quenching at least two axially spaced portions of the one of the steel bar and the steel pipe to form at least two quenched portions;
    a machining step of performing one of plastic working and cutting on a portion of the one of the steel bar and the steel pipe between the at least two quenched portions to form the machined portion; and
    a plating step in which the non-plated portion of the at least two quenched portions that faces the plated portion of the at least two quenched portions across the machined portion is not plated, but a region of the one of the steel bar and the steel pipe that includes at least a part of one of the at least two quenched portions is plated to form the plated portion.

9. The method of claim 8, wherein a tempering step of tempering each of the at least two quenched portions is performed after the plating step.

10. The method of claim 8, wherein a pre-plating grinding step of carrying out one of grinding and polishing on at least a part of the region to be plated is performed after the quenching step and before the plating step.

11. The method of claim 9, wherein the tempering of the one of the at least two quenched portions is not performed after the quenching step and before the plating step, and the tempering step also serves as baking.

12. The method of claim 9, wherein a post-plating grinding step of carrying out one of grinding and polishing of the plated portion is performed after the tempering step.

13. The method of claim 11, wherein a post-plating grinding step of carrying out one of grinding and polishing of the plated portion is performed after the tempering step.

14. The method of claim 9, wherein a measuring step of measuring a hardness of the at least a part of the one of the at least two quenched portions is performed after the tempering step.

15. The method of claim 8, wherein, in the quenching step, high-frequency induction quenching for heating the one of the steel bar and the steel pipe by an induction heating coil is performed.

* * * * *